UNITED STATES PATENT OFFICE.

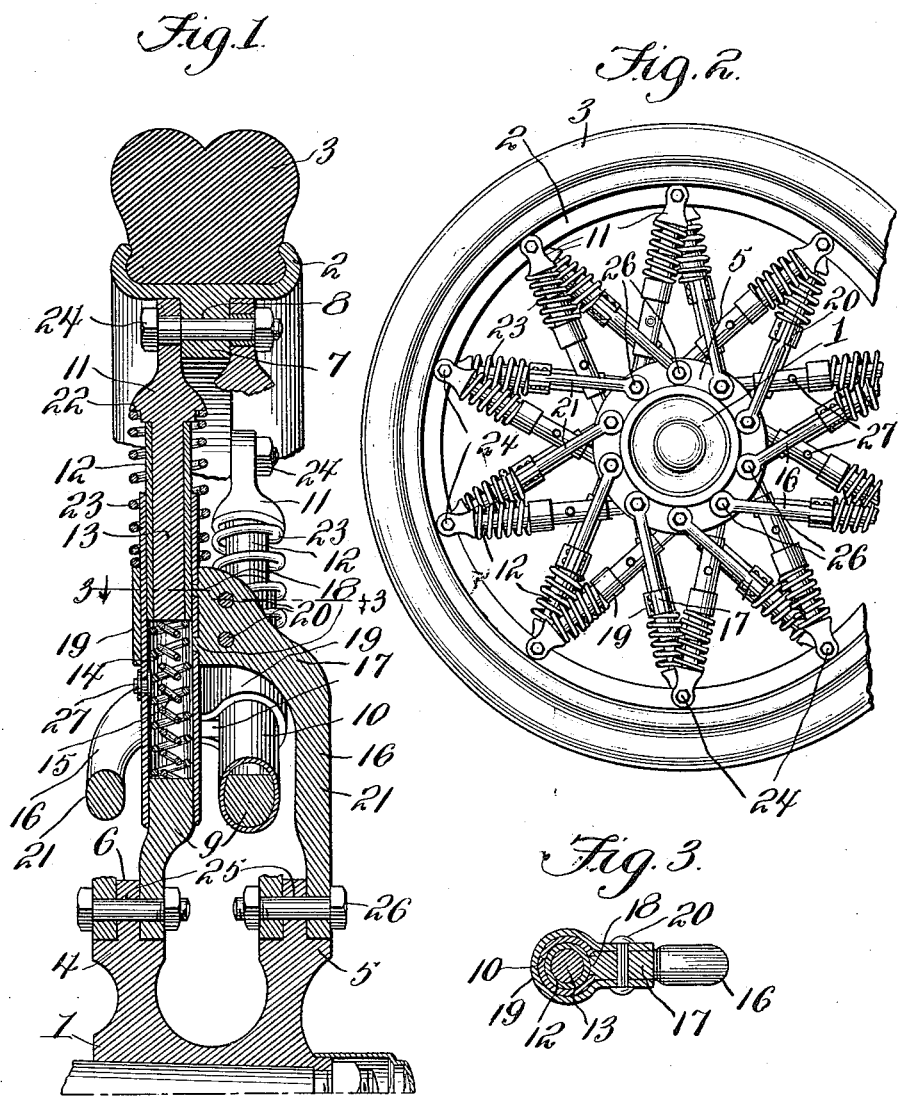

ARCH MOON, OF FALLON, NEVADA.

SINGLE-SPOKE-CUSHION WHEEL.

1,143,427.

Specification of Letters Patent. Patented June 15, 1915.

Application filed September 3, 1913. Serial No. 787,956.

*To all whom it may concern:*

Be it known that I, ARCH MOON, a citizen of the United States, residing at Fallon, in the county of Churchill and State of Nevada, have invented new and useful Improvements in Single-Spoke-Cushion Wheels, of which the following is a specification.

This invention relates to vehicle wheels.

The primary object of the present invention is the provision of a wheel of this character which will embody the use of telescopic resilient spokes between the felly and hub; the arrangement of said spokes in series so that the spokes of one series are extended at an opposite angle to the spokes of the companion series so as to form therewith substantially torquewise braces which effectually act to reduce the shocks and jars imparted to the wheel; and, further, the construction of this form of wheel which will be strong and durable, light and inexpensive, and one which will consist of comparatively few parts that are capable of being readily separated as the occasion may demand.

Another object of the invention is the provision of a wheel wherein the spokes of one series are offset relatively of the spokes of the other series and arranged axially of the wheel so as to operate with the maximum efficiency to equally receive and absorb the shocks and jars that are imparted thereto.

A still further object of the invention is to provide means for bracing the spokes to prevent buckling of the telescopic portions thereof.

With these and other objects in view, the invention consists of certain novel features of construction, combination and arrangement of parts as will be hereinafter described and claimed.

In the accompanying drawings:—Figure 1 is a vertical section through a portion of the wheel; Fig. 2 is a side view thereof; and Fig. 3 is a section on line 3—3 of Fig. 1.

The wheel comprises a hub 1 and a rim 2, the latter being of any suitable well known construction and is adapted to accommodate itself to a tire such as the one shown at 3. The hub 1 is provided with companion identically-formed rings 4 and 5, which are provided with annular reduced portions 6 for a purpose to be hereinafter explained. The rim 2 is provided with a continuous centrally disposed and inwardly-extending flange 7, which is provided with transverse passages 8.

The inner structure of the wheel, or in other words that part between the felly 1 and rim 2 is made up of series of spoke units, and as illustrated the units of one series are extended at an opposite angle to the units of the companion series and disposed at a direct tangent to the hub. Each spoke comprises a telescopic inner section, which consists of a member 9 having a tube 10 brazed thereto and extended therefrom in the direction of the rim 2, and as illustrated said tube is shown to receive an outer section 11 having a wear tube 12 fitting within the section 10 and embracing a stem 13 of said section 11. Springs 14 and 15 are arranged within one another and mounted in the tube 10, and as illustrated the respective ends of these springs bear against the members 9 and 13, so that, under the action of the springs, the spoke sections tend to separate from one another normally.

Each of the spokes is provided with a brace 16 having an offset portion 17, which is secured at 18 to the tube 10. The offset portion 17 of the brace is provided with a metallic strap or sleeve 19, which extends around the tube 10 and which is provided with terminals that are riveted or otherwise suitably secured, as at 20, to the sides of the portion 17 of the brace. The offset portion 17 of the brace is such that the main body portion or branch 21 of the brace is disposed substantially in parallel spaced relation to the tube 10, for a purpose to be hereinafter explained. The section 11 of each spoke is provided with an annular shoulder 22, against which one end of a spring 23 is seated. The opposite end of the spring is seated against the offset portion 17 of the brace 16 of the spoke so that, under the action of the spring, it coöperates with the companion springs 14 and 15 to render the structure properly buoyant and capable of receiving and cushioning or absorbing the shocks and jars that are imparted thereto. Twenty spokes are preferably employed in the construction of the wheel herein contemplated, while ten of the openings 8 are arranged in the rim 2, so that the sections 11 of two spokes of the companion series described may be arranged side by side and at the sides of the flange 7, so as to receive therewith a single fastening bolt 24. This bolt is passed through the opening 8, as shown in Fig. 1, and through alined openings in the sections 11 of companion spokes. Each of the rings 6 of the hub is provided with an annular series of openings 25. The branch 21 of the brace 16 of one of the spokes is associated with the section 9 of an adjacent spoke and through the latter and the former and through the opening 29 may be extended a securing bolt 26, ten of such bolts being provided for each of the rings 4 and 5. The construction of the wheel as described is such that the spokes are arranged so as to maximize their efficiency for the purpose intended, while the arrangement is such that the structure between the rim and the hub is comparatively compact and of such form as to permit any one of the spokes to be removed from the wheel as the occasion may demand. Each of the tubes 10 is provided with a grease cap 27 by means of which a lubricant may be introduced to the working parts forming the telescopic section of the spokes.

The arrangement of the wheel so that the spokes of one series extend at an opposite angle to the spokes of the other series is such that the sections 9 of the spokes of one series are extended through the spaces between the sections 9 of the spokes of the other series and the branches 21 of said spokes, as clearly illustrated in Fig. 1.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as claimed.

I claim:—

In a resilient wheel, in combination, a felly, a hub, two rings spaced apart upon said hub, a circumferentially extending series of pivots secured in said felly, annular secured portions formed integrally upon said rings, two circumferentially extending series of sleeves, one series of sleeves being disposed eccentrically with respect to said rings and the other series being similarly disposed thereto and having their planes disposed at right angles with respect to said first named series of spokes whereby to intersect with the latter, braces secured at one end upon the outer face of said reduced portions, of said rings, an offset portion formed integrally upon each of said braces, upper and lower spoke sections telescoping in said sleeve, the upper spoke sections being arranged in pairs in secured position upon said pivot at opposite ends thereof and the lower spoke sections being secured to the inner faces of said reduced portions of said rings, means for yieldably mounting said sections in said sleeve, parallel lugs formed integrally upon each of said sleeves between which said offset portions are disposed and secured, each of said sleeves projecting between one of said sleeves and one of said braces.

In testimony whereof I affix my signature in presence of two witnesses.

ARCH MOON.

Witnesses:
S. E. BAUMANN,
GEORGIA E. SHUMAN.

Copies of this patent may be obtained for five cents each, by addressing the "Commissioner of Patents, Washington, D. C."